United States Patent [19]

Komine et al.

[11] Patent Number: 5,207,965
[45] Date of Patent: May 4, 1993

[54] METHOD FOR MANUFACTURING AN ELASTIC MOLD

[75] Inventors: Shigeo Komine, Tokyo; Toshiya Fujishima, Kamakura, both of Japan

[73] Assignee: Komine Rubber Industrial Co., Ltd., Tokyo, Japan

[21] Appl. No.: 795,302

[22] Filed: Nov. 20, 1991

Related U.S. Application Data

[60] Continuation of Ser. No. 496,080, Mar. 15, 1990, abandoned, which is a continuation of Ser. No. 298,311, Jan. 17, 1989, abandoned, which is a continuation of Ser. No. 38,573, Apr. 15, 1987, abandoned, which is a division of Ser. No. 920,384, Oct. 20, 1986, abandoned.

[30] Foreign Application Priority Data

Oct. 19, 1985 [JP] Japan ................. 60-160288
Oct. 19, 1985 [JP] Japan ................. 60-234203

[51] Int. Cl.$^5$ ............................................. B29C 41/14
[52] U.S. Cl. ....................................... 264/226; 264/101; 264/304; 264/334; 264/335; 264/331.13; 264/306; 425/269; 425/437; 249/55
[58] Field of Search ............... 264/301, 304, 306, 255, 264/101, 334, 335, 225, 331.13, DIG. 78, 220, 226; 425/275, 436 R, 269, 437; 249/55

[56] References Cited

U.S. PATENT DOCUMENTS

| | | | |
|---|---|---|---|
| 1,968,887 | 8/1934 | Hansen | 264/306 |
| 2,124,871 | 7/1938 | Beal | 264/86 |
| 2,278,764 | 4/1942 | Boyle | 264/301 |
| 2,378,701 | 6/1945 | Habib et al. | 264/301 X |
| 2,509,531 | 5/1950 | Ruhland | 264/306 |
| 2,605,505 | 8/1952 | Ruhland | 264/306 |
| 2,660,776 | 12/1953 | Miller | 249/55 |
| 2,670,502 | 3/1954 | Cox | 425/275 X |
| 3,005,237 | 10/1961 | Anderson | 264/306 |
| 3,306,965 | 2/1967 | Lucas et al. | 264/306 X |
| 3,730,666 | 5/1973 | Bowles | 425/405 H |
| 4,051,296 | 9/1977 | Windecker | 264/225 X |
| 4,098,856 | 7/1978 | Rosenau | 264/306 |

FOREIGN PATENT DOCUMENTS

| | | | |
|---|---|---|---|
| 51-4283 | 1/1976 | Japan | 264/301 |
| 697071 | 1/1952 | United Kingdom . | |

Primary Examiner—Jeffery Thurlow
Assistant Examiner—Mathieu Vargot
Attorney, Agent, or Firm—Armstrong, Westerman, Hattori, McLeland & Naughton

[57] ABSTRACT

An elastic mould of this invention includes a pattern and a fixing sheet which is integrally mounted at an open edge of the pattern. The elastic mould is manufactured by dipping a pattern mounted on a plate into an elastic body-producing solution to form a gel-like elastic film, withdrawing, drying and vulcanizing the object thus formed, and peeling the elastic film off the pattern to obtain a mould having a fixing member as an integral part of the mould.

5 Claims, 2 Drawing Sheets

METHOD FOR MANUFACTURING AN ELASTIC MOLD

This application is a continuation of application Ser. No. 07/496,080 filed Mar. 15, 1990, which is a continuation of application Ser. No. 298,311 filed Jan. 17, 1989, which is a continuation of application Ser. No. 038,573 filed Apr. 15, 1987, which is a divisional of Ser. No. 920,384, filed on Oct. 20, 1986, all now abandoned.

BACKGROUND OF THE INVENTION

1. Field of the Invention

The present invention relates to elastic moulds for the production of such castings as ice, ice cream, chocolate, jelly, cube sugar, fish paste, soap and concrete. This invention also relates to methods for manufacturing the above elastic mould.

2. Description of the Prior Art

At present, jelly and chocolate have been produced by casting them in a large mould and cutting the cake thus formed into a prescribed size. Alternatively, an array of moulds has been used to obtain the required number of products in one lot.

However, such conventional moulds as have been used in casting confectionary materials are all metal moulds, especially split moulds. These split moulds tend to leave the joint of the mould on the surface of the product thus formed, resulting in poor appearance and lower product value. Furthermore, shape design has been restricted because certain subtle shapes including reverse-tapered shaped are hard to obtain. In addition, the use of the split mould makes it difficult to withdraw the product from the mould and is often found to be very costly.

Thus, according to this invention, elastic moulds are used to produce desired products. Conventional methods for the manufacture of the elastic moulds such as the rubber-made moulds comprise dipping only a pattern itself which is mounted on a plate. The elastic mould thus manufactured, however, does not have any fixing sheet which is necessary for holding the elastic mould to a moulding machine.

Thus, the principal object of the present invention is to provide a novel and industrially feasible method of manufacturing elastic moulds which is characterized in that the fixing sheet is produced as an integral part together with the elastic mould to replace the conventional metal mould.

SUMMARY OF THE INVENTION

The present invention is provided to solve the aforementioned problems and is characterized in that an elastic mould comprises a molding surface and a fixing sheet which is integrally mounted at open edge of the pattern and in that a method of manufacturing the elastic moulds comprises dipping a pattern mounted on a plate into an elastic body-producing solution to form a gellike elastic film, drying and vulcanizing the object thus formed, and peeling the elastic film off both the pattern and the plate to obtain a mould with a fixing sheet attached to it.

This elastic mould is used as follows. The method comprises a pouring step where material is poured into an elastic mould, a hardening step where the poured material is hardened, and a withdrawal step where the hardened object is withdrawn from the inside of the elastic mould.

In the pouring step, a fixing of the elastic mould is necessary during pouring operation of the material. Further, in the hardening step, a fixing of the elastic body is necessary.

In one example of the withdrawal step, the mould is loosened by pulling the fixing member (sheet), and the object thus hardened is then pushed from the opposite side of the fixing member attached to the mould. Hence, the fixing member functions as a pulling member, too.

Alternatively, in another example of the withdrawal step, a vacuum can be utilized for removing the hardened product. The fixing member supports a vacuum chamber which is tightly connected with the mould. The object is then withdrawn by applying a vacuum. Hence, in this case the fixing member functions as a supporting member, too.

As an elastic mould according to the present invention comprises a pattern and a fixing sheet (member) which is integrally mounted at open edge of the pattern, the elastic mould can be easily used.

The manufacturing method of the elastic mould will be hereinafter described with an embodiment using a natural rubber latex solution as the elastic body-producing solution.

First, a pattern unit to be dipped in the solution is manufactured by mounting a model pattern of predetermined shape on a plate.

Secondly, the pattern unit is dipped into a natural rubber latex solution. The latex should contain elastic rubber compositions to provide elongation for the rubber-made mould. Solidification in the mould occurs either by cooling or heating and the compositions of the above rubber-made mould should vary accordingly. Oil-resistant rubber latex must be selected for an oily material such as chocolate.

The pattern unit is usually allowed to be dipped in the natural rubber latex solution until the rubber compositions adheres in a thickness of 0.8 to 1.0 mm. It should be noted that the rubber compositions adhere to the plate as well as the model pattern, both of which have been dipped into the latex solution.

Afterwards, after the object thus formed is dried in the drier of 60°–80° C. for approximately 60 to 90 minutes, it is vulcanized. The product mould is then taken out from the pattern. It should also be noted that the mould is mounted on the surface of the rubber plate. Therefore, the flat plate thus formed functions as a fixing sheet for the product mould.

As an elastic body-producing solution, a silicone rubber, an urethane rubber and a butadiene rubber in addition to the natural rubber latex can be used.

BRIEF DESCRIPTION OF THE DRAWINGS

In the drawing, there is shown a preferred embodiment of this invention.

FIG. 4 is a partial, sectional view showing the pattern dipped into a coagulating solution.

FIG. 5 is a partial, sectional view showing the pattern taken out from the coagulating solution.

FIG. 6 is a partial, sectional view showing the pattern dipped into a rubber latex solution.

FIG. 7 is a partial, sectional view showing the pattern which has been taken out from the rubber latex solution.

FIG. 8 is a partial, sectional view showing a rubber film which has been detached from the pattern.

FIG. 9 depicts the front and side views of the final rubber-made mould product.

DETAILED DESCRIPTION OF PREFERRED EMBODIMENTS

Examples of the present invention will be described with reference to the drawings.

An elastic mould manufactured according to the present invention is used for obtaining a molded product. First, raw materials are poured into the inside of the elastic mould and allowed to solidify. Second, the materials thus formed are taken out as the product.

The raw materials include refrigeration-solidifying ones such as ice, and heat-solidifying ones such as fish paste. There are also some types of fat-containing materials as exemplified by chocolate. Several uses of the elastic mould of this invention will be presented in the following examples.

EXAMPLE 1

Example 1 relates to the method for the manufacture of rubber-made moulds for refrigeration-solidifying materials such as ice.

Figure 2:
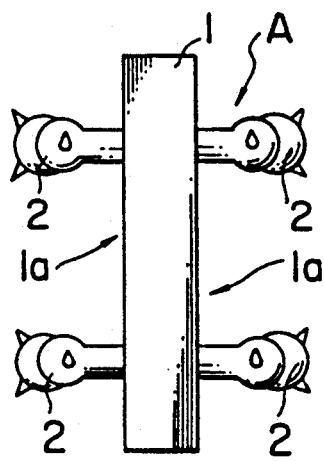
FIGS. 2 and 3 illustrate the front and side views of the pattern unit to be dipped.
Figure 3:
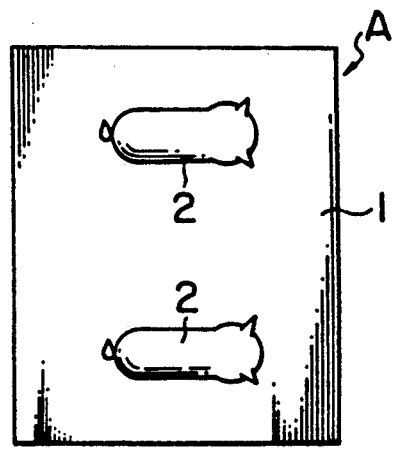

FIGS. 2 and 3 are the front and side views of the pattern unit to be dipped (A) wherein two mold molds (2) extend from both surfaces (1a) of the plate (1). The plate (1) in the pattern unit (A) is likely to be subjected to heat-treatment and should be made of heat-resistant synthetic resin such as polypropylene (PP) and ABS resin, and heat-resistant synthetic rubber such as neoprene and butadiene acrylonitrile rubber (NBR). The pattern (2) can be made of appropriate materials including glass, porcelain, heat-resistant synthetic resins such as polypropylene (PP) and acrylonitrile-butadiene-styrene (ABS) resin, and corrosion-resistant metals.

The pattern (2) can be shaped as required for the product to be formed in the rubber-made mould of the present invention. In order to meet user's demands, fancy patterns such as figures of small animals, for example, can be used in the mould for producing ice cream and chocolate.

The spacing of the pattern (2) on the plate (1) should be so determined that the width of the fixing sheet (3) is enough to secure the mould unit to the moulding machine.

Although details of the drawing are not shown, the joint between the pattern (2) and the plate (1) should be a rounded corner. This is helpful to make a thickness of rubber film uniform, and also makes it difficult to have cracked rubber surface when the vulcanized rubber film is peeled off from the pattern unit (A). An arc-like plate is more effective for these purposes than a flat plate.

Figure 4:
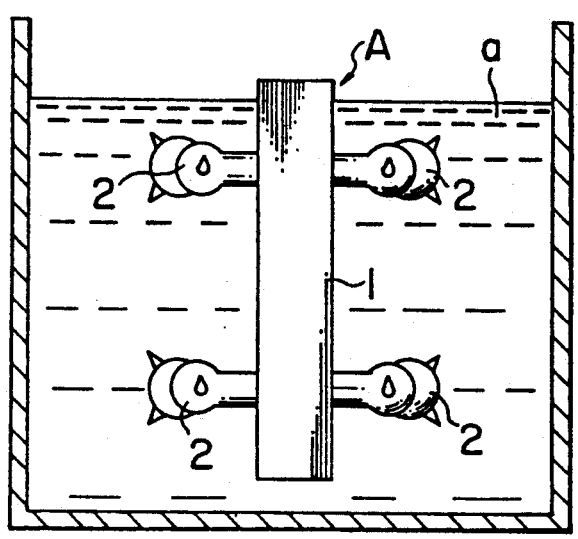
FIGS. 4 to 9 show the manufacturing steps of the present invention.

A method for the production of rubber-made moulds according to the present invention will be described in the order of production sequence. First, the forementioned pattern unit (A) is washed to remove any dirt and then dried at about 60° to 80° C. for 10 to 20 min. Second, the pattern unit (A) is pretreated to facilitate rubber adhesion by means of ion effects. A coagulation liquor containing 40 parts by weight of calcium nitrate, 0.5 parts by weight of glycerine, and 59.5 parts by weight of methanol is used, into which the pattern unit (A) is dipped. Reference should be made to FIG. 4.

Figure 5:
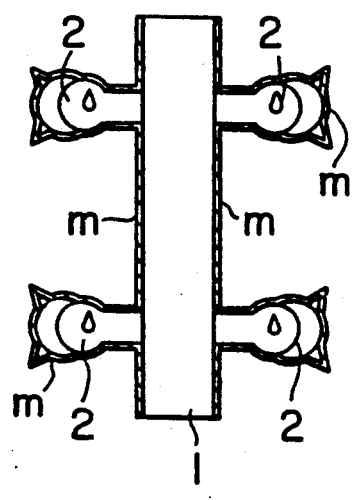

In order to avoid air-bubble entrainment and to provide uniformity of film thickness, it is preferable that the face of the plate of the pattern unit (A) is dipped at a right angle to the surface of the liquor. Then, the pattern is pulled out from the coagulation liquor (a) and dried at about 70° to 80° C. for about 10 min. to evaporate the methanol. A film of calcium nitrate (m) is thus formed around the surface (1a) of the pattern unit (A). Reference should be made to FIG. 5.

The thickness of the calcium nitrate film (m) associated with dipping into and pulling out the coagulation liquor is generally determined by the rate of pulling out. A pulling-out rate of 100 mm/min was employed in this example.

Since this pretreatment is intended to provide a uniform film thickness as well as to avoid air-bubble entrainment, this step may be omitted when a certain degree of non-uniformity of the rubber film (c) is tolerated. A pretreatment by means of the heat-sensitive method can also be applied wherein a pattern unit (A) is preheated at about 60° C.

Figure 6:
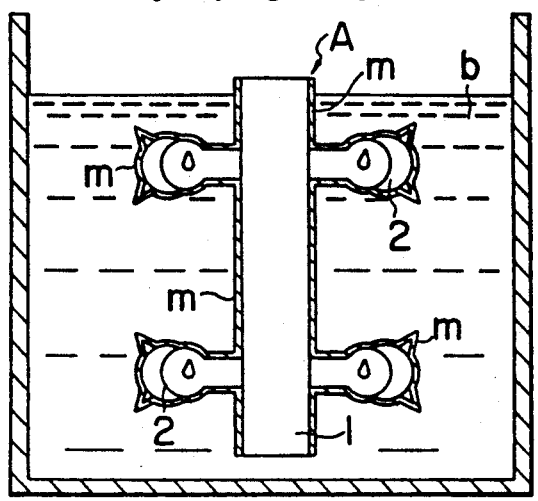
Figure 7:
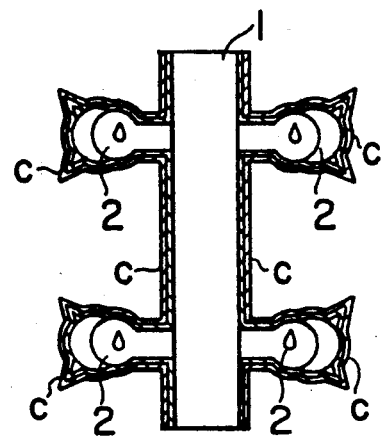

Then, the pattern unit (A) pretreated in this way was wholly dipped into the rubber latex solution (b) for about 10 to 15 minutes as shown in FIG. 6 with the face of the plate of the pattern unit (A) at a right angle to the surface of the solution. The surface of the pattern unit (A) was wholly covered with a rubber film (c) having a thickness of 0.8 to 1.0 mm as shown in FIG. 7.

The rubber latex (b) had the following solid contents based on the weight of each component.

| | |
|---|---|
| 60% natural rubber latex | 100.0 |
| Non-ionic stabilizer | 0.1 |
| (KAOH CORPORATION: EMALGEN 810) | |
| Potassium hydroxide | 0.3 |
| Sulfur | 1.0 |
| Zinc oxide | 0.6 |
| Mercaptobenzothiazole zincate | 0.7 |
| Diethyldithiocarbamic acid zincate | 0.2 |

Figure 8:
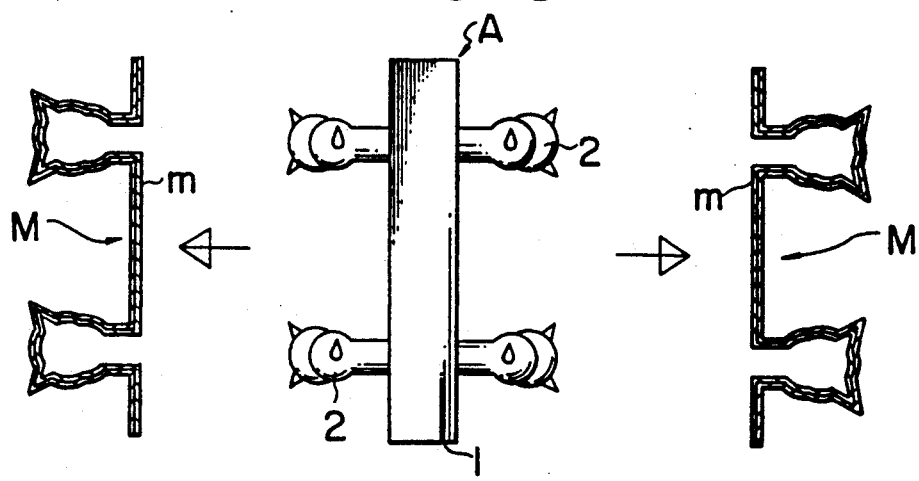
Figure 9:
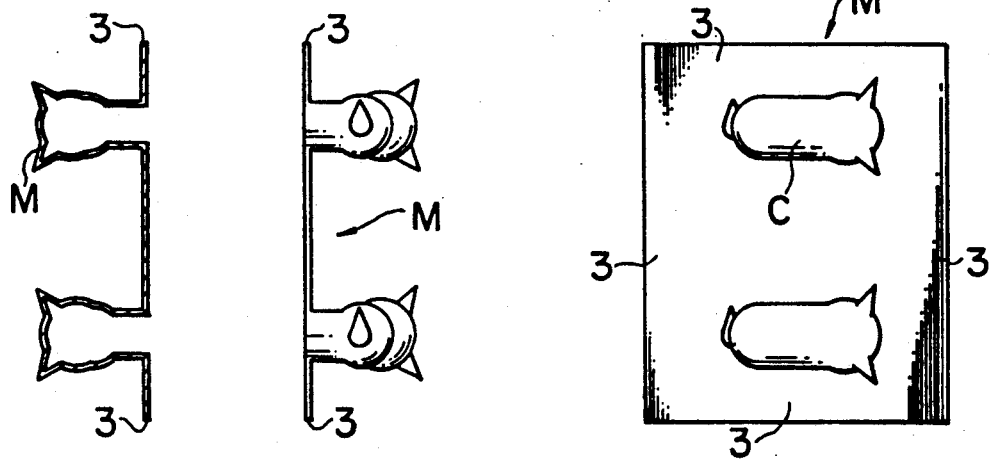

The rubber film (c) was developed not only on the pattern member (2) but also on the whole surface (1a) of the plate (1), and the latter part served as the fixing sheet (3). Then, the pattern unit (A) on which the rubber film (c) had been developed was dried and vulcanized at 80° to 90° C. for about 60 to 90 minutes. Afterwards, the rubber film was peeled off from the pattern unit (A). (FIG. 8)

Then, the rubber film (c) which had been peeled off from the pattern unit (A) was immersed in a circulating water stream maintained at 60° to 65° C. for a period of approximately five hours to remove calcium nitrate and aqueous non-rubber components excluding natural rubber latex. And then, the rubber film thus obtained was allowed to stand in a dehumidifier at 70° to 80° C. for about 15 hours to produce a rubber-made mould.

The rubber-made mould thus manufactured was composed of a bag-like section corresponding to the pattern member (2) and a fixing sheet (3) connecting to the open end of the pattern member (2). Therefore, a rubber-made mould applicable for a practical use can be obtained by cutting the fixing sheet (3) so as to leave the required width of the plate.

Properties of the rubber-made mould thus produced are given as follows:

| Low-temperature tensile test | | |
| --- | --- | --- |
| | Ambient | Low temp. |
| Tensile strength (Kgf/cm$^2$) | 361 | 529 |
| Elongation (%) | 900 | 790 |
| 500% tensile stress | 36 | 88 |
| Permanent elongation (%) | 3 | — |

*Test method
JIS K 6301 (Physical test method for vulcanized rubber)
Test temperature: −25 ± 1° C.
Low temp. time: 60 minutes

| Low-temperature repeated elongation test | |
| --- | --- |
| Elongation cycle | State |
| 3000 | normal |
| 5000 | normal |
| 10000 | tore-off |

*Test method
de Mattia flexing tester
Test temperature: −25° C.
Elongation cycle: 300 cycles/min
Standard distance: 20 mm

EXAMPLE 2

Example 2 relates to the method for the manufacture of rubber-made moulds for heat-solidifying materials such as fish paste.

Except for the formulation of the rubber latex solution (b), Example 2 is almost the same as Example 1. Description, therefore, will be given only to the formulation of the latex solution (b) and the characteristics of the product or the rubber-made mould. The description of other manufacturing steps will be omitted.

The rubber latex (b) had the following solid contents based on the weight of each component.

| | |
| --- | --- |
| 60% natural rubber latex | 100.0 |
| Non-ionic surfactant | 0.2 |
| (KAOH CORPORATION: EMALGEN 911) | |
| Potassium hydroxide | 0.5 |
| Zinc oxide | 3.0 |
| Promoter, tetramethylthiuram disulfide (TT) | 3.0 |
| (KAWAGUCHI KAGAKU CO.: ACCEL TMT) | |
| Promoter, zinc ethylphenyl dithiocarbamate (PX) | 1.0 |
| (KAWAGUCHI KAGAKU CO.: ACCEL PX) | |
| Thiourea | 1.0 |
| Anti-aging agent (Phenolic) | 2.0 |

The rubber-made mould manufactured by the use of the above rubber latex solution (b) had the following characteristics.

| Physical properties | |
| --- | --- |
| 300% modulus (Kgf/cm$^2$) | 13.0 |
| Tensile strength (Kgf/cm$^2$) | 321.0 |
| Elongation (%) | 900.0 |
| Heat-resistance test | |
| 300% modulus (Retention) | |
| 100° C. × 24 H | 101.5% |
| 100° C. × 48 H | 107.5% |
| 100° C. × 96 H | 103.0% |
| 100° C. × 168 H | 100.0% |
| Tensile strength (Retention) | |
| 100° C. × 24 H | 95.8% |
| 100° C. × 48 H | 92.2% |
| 100° C. × 96 H | 88.8% |
| 100° C. × 168 H | 78.2% |
| Elongation (Retention) | |
| 100° C. × 24 H | 98.5% |
| 100° C. × 48 H | 97.5% |
| 100° C. × 96 H | 97.8% |
| 100° C. × 168 H | 95.3% |

EXAMPLE 3

Example 3 relates to the method for the construction of rubber-made moulds for casting fat-containing materials such as chocolate.

Except for the formulation of the rubber latex solution (b), Example 3 is almost the same as Example 1. Description, therefore, will be given only to the formulation of the latex solution (b) and to the characteristics of the product rubber-made mould. The description of other construction steps will be omitted.

The rubber latex solution (b) had the following solid contents based on the weight of each component.

| | |
| --- | --- |
| Carboxylated NBR latex | 100.0 |
| Non-ionic surfactant | 0.5 |
| Potassium hydroxide | 0.75 |
| Accelerator, zinc dibutyl dithiocarbamate (BZ) | 0.25 |
| (KAWAGUCHI KAGAKU CO.: ACCEL BZ) | |
| Zinc oxide | 5.0 |
| Sulfur | 0.5 |

The rubber-made mould constructed by the use of the above rubber-made solution (b) had the following characteristics.

| Physical properties | |
| --- | --- |
| 300% modulus (Kgf/cm$^2$) | 60.0 |
| 500% modulus (Kgf/cm$^2$) | 175.0 |
| Tensile strength (Kgf/cm$^2$) | 316.0 |
| Elongation (%) | 580.0 |

| Oil/solvent resistance of vulcanized rubber film | | |
| --- | --- | --- |
| | A | B |
| Carboxylated NBR latex | 1.0 | 0.8 |
| Natural rubber | 164 | 112 |
| Chloroprene | 20 | 4 |

Figure 1:
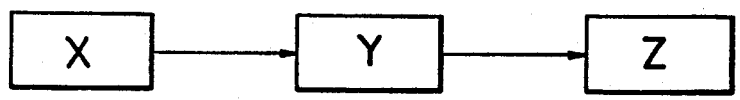
FIG. 1 is a block diagram of an use of an elastic mould according to the present invention.

*The above numerals indicate the degree of area expansion (%).
A: 25° C. Hexane
B: 25° C. ASTM #2 Oil
Immersion time: 24 hours The method of casting by the use of the rubber-made mould thus constructed will be briefly described based on FIG. 1. The method comprises a pouring step X where material is poured into a rubber-made mould, a hardening step Y where the poured material is hardened, and a withdrawal step Z where the hardened object is withdrawn from the inside of the rubber-made mold (M).

In the pouring step X, low-viscosity material can be easily poured from the top of the mold (M) while high-viscosity material are injected through a pouring nozzle which is inserted in the mold (M). To avoid entrapped air bubbles, the nozzle is gradually lifted as the level of the material being poured increases.

In the hardening step Y, treatments such as cooling, heating, and humidification are carried out, depending upon the nature of the material.

In the withdrawal step Z, the mold (M) is first loosened by pulling the flexible fixing member (3) of the rubber-made mould, and then the object thus hardened is pushed from the opposite side of the fixing member (3) attached to the mold (M). Hence, the fixing member functions as a pulling member, too.

Alternatively, a vacuum can be utilized for removing the hardened product. The fixing member (3) supports a vacuum chamber which is tightly connected with the mould (2). The object is then withdrawn by applying a vacuum. Hence, in this case the fixing member functions as a supporting member, too.

In the above mentioned Examples, a natural rubber latex as an elastic body-producing solution has been described. However, in addition to the natural rubber latex, a silicone rubber, an urethane rubber and a butadiene rubber of a synthetic rubber can be used.

Any materials as an elastic body-producing solution can be used if they have a flexibility (elongation) to be suitable for use and a restoration.

Further, in case that the finally moulded product is a food, safe and no dangerous materials should be selected.

According to the present invention as described above, a whole of the pattern unit (A) is dipped into an elastic body-producing solution, for example, a rubber latex solution, to form a fixing member (3) as an integral part of the mold (M). The mould provides necessary patterns for castings such as jelly and chocolate while the fixing member provides necessary functions for the withdrawal step.

What is claimed is:

1. A method of manufacturing an elastic mold, which comprises the steps of: pretreating an external surface of a pattern mounted on a face of a plate to facilitate rubber adhesion of the pattern, the pretreating step comprising dipping the pattern mounted on the face of the plate into a coagulation liquor, said face of the plate being dipped at a right angle to a surface of the coagulation liquor and withdrawing said pattern from said coagulation liquor to provide a uniform film thickness and avoid air bubble entrainment in the elastic mold product;

dipping the pattern mounted on the face of the plate into an elastic mold solution, the face of the plate being dipped at right angles to a surface of said elastic mold solution to form an elastic film on the plate and on the external surface of the pattern;

withdrawing the pattern from said elastic mold solution;

vulcanizing the film on the pattern; and peeling the film off the pattern to obtain an elastic mold having an internal surface for receiving and holding casting material, the internal surface of the elastic mold being defined by the external surface of the pattern, said internal surface being in contact with said external surface prior to peeling of the elastic mold, and said elastic mold having a fixing member which corresponds to the face of said plate as an integral part of the mold.

2. The method of manufacturing elastic molds according to claim 1, wherein the elastic mold solution is a natural rubber latex.

3. The method of manufacturing elastic molds according to claim 1 or claim 2, wherein the pattern is pretreated with a coagulation liquor containing 40 parts by weight of calcium nitrate, 0.5 parts by weight of glycerine and 59.5 parts by weight of methanol.

4. The method of manufacturing elastic molds according to claim 2, wherein the pattern after it is dipped into the elastic mold solution, is dried.

5. The method of manufacturing elastic moulds according to claim 1, wherein the elastic mold solution is a solution of one member selected from the group consisting of a silicone rubber, an urethane rubber and a butadiene rubber.

* * * * *